Jan. 30, 1968 E. SCHOPPE, JR., ETAL 3,366,129
FLUID LOGIC ANTI-COINCIDENCE DEVICE BY DELAY
Filed June 24, 1964
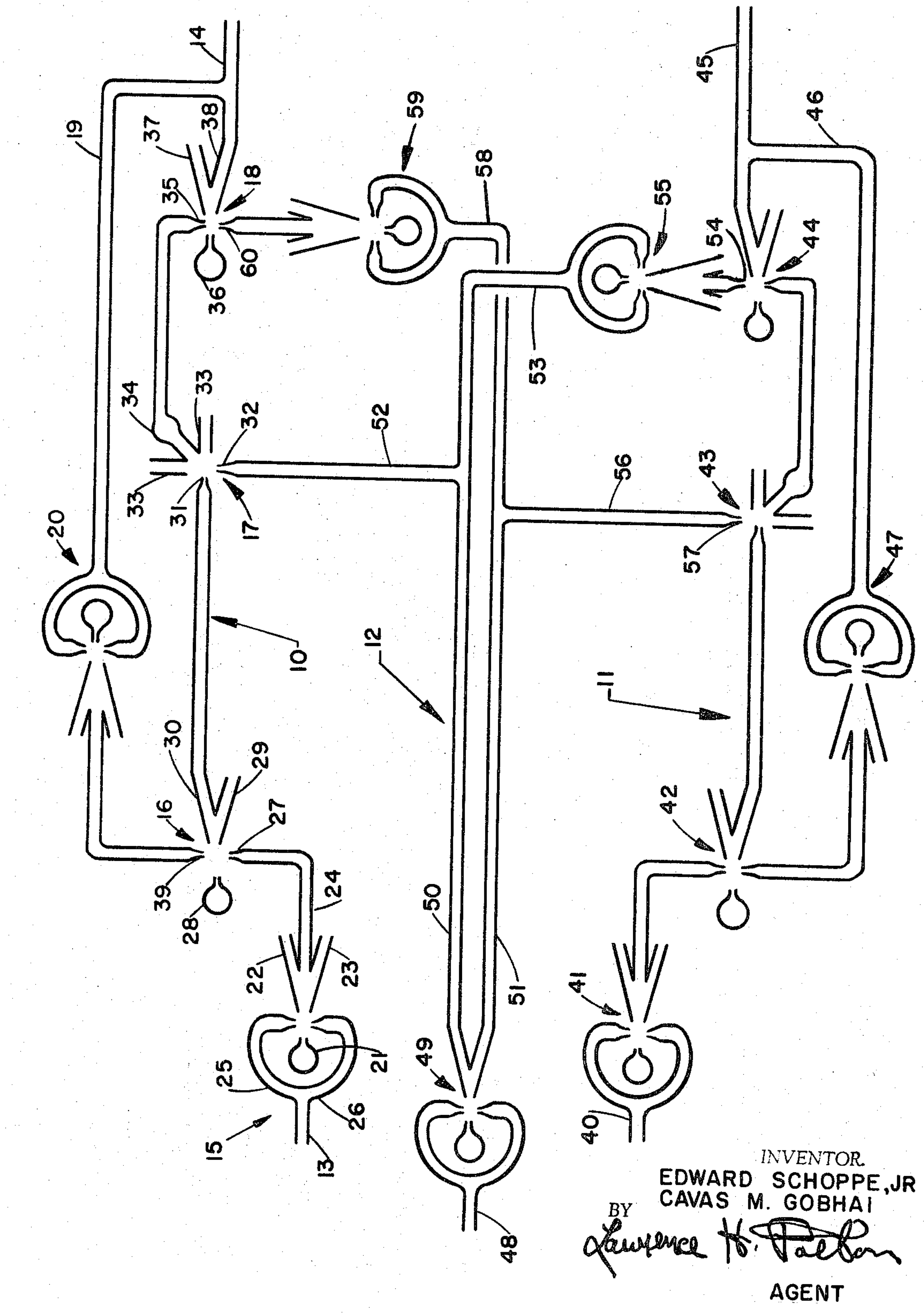
INVENTOR.
EDWARD SCHOPPE, JR
CAVAS M. GOBHAI
BY Lawrence H. Paelton
AGENT United States Patent Office 3,366,129
Patented Jan. 30, 1968

3,366,129
FLUID LOGIC ANTI-COINCIDENCE DEVICE BY DELAY

Edward Schoppe, Jr., Walpole, and Cavas M. Gobhai, Cambridge, Mass., assignors to The Foxboro Company, Foxboro, Mass., a corporation of Massachusetts Filed June 24, 1964, Ser. No. 377,549
1 Claim. (Cl. 137—81.5)

This invention relates to systems using binary operating fluid logic devices with no moving parts, in compact units.

This invention is particularly concerned with a situation in which there are two similar pulse trains. Its function is to prevent coincidence of a pulse in one train with a pulse in another train. This function is accomplished dynamically according to this invention on a continuous flow basis without the loss of any of the pulses.

When such coincidence occurs one of the pulses is momentarily delayed so that the other may appear in the output first.

The device according to this invention may be used to prevent ambiguities in the later operation of a bi-directional counter, or for any other similarly suitable application.

This device accomplishes this invention by means of a pair of pulse train systems which are operatively associated and joined by a timing oscillator system common to both, and operable to activate first one system and then the other. If a pulse occurs in the system not activated at the moment by the timing oscillator system, it is momentarily held and in this fashion pulses in different trains which enter the device in coincidence are separated in time and exit from the device not in coincidence.

This invention therefore provides a new and useful fluid logic device for anti-coincidence function with respect to a pair of similar pulse trains.

Other objects and advantages of this invention will be in part apparent and in part pointed out hereinafter and in the accompanying drawing, wherein:

The drawing presents a schematic illustration of an anti-coincidence device according to this invention.

In the drawing, the pulse train systems and the time oscillator system are illustrated as operating from left to right. One pulse train is indicated at 10, at the top of the drawing, and the other is indicated generally at 11, at the bottom of the drawing. The timing oscillator system is indicated generally at 12, between the pulse train systems 10 and 11. The pulse train system 10 has an input passage therefor at 13, an output passage at 14. This system 10 consists of a series arrangement of a differentiator 15, a flip flop unit 16, an "and" gate 17, and a flip flop 18. From the output 14 there is a feedback passage 19 leading back to the first flip flop 16, through a differentiator 20.

The input differentiator 15 is provided with a power source at 21. It is generally in the form of a flip flop unit, with the ordinary flip flop outputs 22 and 23 used only as vents. Between the outputs 22 and 23 there is a central output 24 through which the pulse train continues into the flip flop unit 16. The differentiator is operated by means of two curved passages 25 and 26 which are essentially uniform in shape. Both stem from the input passage 13. These passages 25 and 26 act as opposing control inputs for the differentiator 15.

By the nature of the formation of the differentiator or by a lateral starting set signal (not shown) it may be considered that the first pulse of the pulse train in the input 13 might use one or the other of the passages 25 and 26. Assuming it to be the passage 25, this first pulse would operate the differentiator to flip the output from the output vent 22 to the output vent 23. In so doing, a pulse would be generated in the common output 24, representative of the controlling pulse which is operating the flip flop device.

At this stage of the operation of the differentiator 15, by the nature of the fluid logic flip flop, there will be a relatively high pressure at the control input of the passage 25 and a relatively low pressure at the control input of the passage 26. Because of this difference in pressure, after the first pulse arrives in the differentiator 15, there is a tendency to equalization of pressure back through the passage 25, and then forward through the passage 26. This tendency sets up a small stream in this counter-clockwise direction.

Accordingly, when the second pulse comes along in the input 13, it will encounter this counter-clockwise flow and will follow it so as to apply the second pulse to the control input 26. This action flips the output in passage 23 to the output passage 22, and in passing provides an output pulse in the common central passage 24.

The input frequency is thus duplicated in the output passage 24 of the differentiator 15. The purpose of this action is to provide a sharp pulse input to the flip flop 16. If the input train is formed of step signals, they will be translated into pulses for the suitable operation of the flip flop 16.

The pulse train, in the form of sharp pulses, now appears in the passage 24 and is applied to the flip flop 16 at a control input 27. The flip flop 16 is provided with a power source 28 and has a vented output 29 and an operating output 30.

The normal inactive situation of the flip flop 16 is with the output in the vent passage 29. When there is a pulse in the control input 27, the flip flop 16 has its output moved to the output passage 30 and this output continues, to provide a control input 31 to the "and" gate 17.

The "and" gate 17 has another control input 32, from the timing oscillator system 12. If there is no signal in the timing input 32 then a pulse in the input 31 will pass through the "and" gate and vent by means of passage 33. Similarly, a timing signal in the control input 32 occurring without a pulse in the input 31 will be vented to output 33.

In the event of simultaneous occurrence of signals in the "and" gate 17 both at 31 and 32, the signals will encounter each other within the "and" gate, mutually deflect each other, and exit through the "and" gate output at 34 as a signal representative of one pulse in the pulse train system 10. The signal in the output passage 34 of the "and" gate 17 is applied to the flip flop unit 18 as a control input at 35. The flip flop 18 has a power source at 36, a vent output 37, and an operating output 38. The flip flop unit 18 is normally established with the output venting through passage 37. When a signal appears in the control input 35, the output is flipped over to the operating output passage 38 as an output signal for the pulse train system 10, by way of output passage 14.

Simultaneously with this action a signal is fed back through passage 19, and through differentiator 20, to a control feedback intput 39 to the flip flop 16. This action flips the signal therein back to the output vent passage 29 to reset this device and cut off the output signal of that system.

The differentiator 20 is structurally identical with the differentiator 15 in the input. It operates in the same manner, so that anything in the form of a step signal will be reduced to a pulse. A pulse will simply be transmitted as a duplicated pulse. Thus whatever controlling signals are applied to the flip flop 16 in the feedback control input 39 are in the form of simple, short, sharp control pulses.

The pulse train system 11, shown at the bottom of the drawing, is a duplication of the system 10 described above and operates identically with respect thereto.

Thus the pulse train system 11 comprises a series arrangement of an input passage 40, a differentiator 41, a flip flop unit 42, an "and" gate 43, and a final flip flop unit 44, leading to an output passage 45. There is also a feedback passage 46 from the output passage 45, through a differentiator 47 to the flip flop unit 42.

The timing oscillator system 12 comprises an input passage 48 to a timing oscillator. This is identical with and operates in the same way as the differentiator 15 of the pulse train system 10, except that the timing oscillator has no central common output, and both of its ordinary flop flop outputs are used.

The two outputs of the timing oscillator are at 50 and 51. From the passage 50 there is a side passage 52 leading to the "and" gate 17 of the pulse train system 10, by way of the control input 32. Also from the timing oscillator output 50, there is an output passage 53 leading to the pulse train system 11, specifically the terminal flip flop unit 44, as a control input 54. The passage 53 includes a differentiator 55 which provides a pulse output like that of the differentiator 15 in system 10, for the purpose of providing suitable operating signals for the flip flop unit 44.

Similarly, from the timing oscillator output 51 there are lateral passages with one at 56, to the pulse train system 11, as a control input at 57, to the "and" gate 43. There is also a lateral passage at 58, through a differentiator 59, to the terminal flip flop 18 of the pulse train system 10, by way of an input control passage at 60.

It will be seen that when the timing oscillator provides a step signal in the output 50, it simultaneously activates the pulse train system 10 "and" gate 17, and resets the pulse train system 11 flop flop 44.

In similar fashion, an output signal in the timing oscillator passage 51, simultaneously activates the pulse train system 11 "and" gate 43, and resets the pulse train system 10 terminal flop flop 18.

In the operation of this device, the timing oscillator is established so that it operates, for example, first in system 10, and then in system 11, in a regular, scanner-like procedure. It looks first to the system 10, to see if there are any pulses going through, or ready to go through. If so, it lets them through, meanwhile holding back pulses in system 11. The reverse is accomplished by way of a signal in the timing oscillator output 51.

If the timing oscillator is in the actuation stage with respect to the system 10, then an input pulse will proceed through the flip flip 16 and through the "and" gate 17 because of the simultaneous appearance of signals at 31 and 32. It will then operate the flip flop 18 to provide the output in the passage 14, and the feedback in the passage 19 to reset the initial flip flop 16. The result is a single output pulse in passage 14.

While this is going on, if there is a coincident pulse in the pulse train system 11 it will reach the "and" gate 43, but will not pass through, except to vent, because there will be no signal in the input passage 57.

When the timing oscillator reverses, and actuates the system 11, the signal which is waiting at the gate 33 will be allowed to pass through. Similar holding action is effective with respect to the gate 17 and the pulse train system 10, when a signal arrives there during the time when the timing oscillator is activating the system 11.

Thus in case of a pulse in one system coincident with a pulse in the other system, according to the timing of the oscillator 49, one of these pulses will be held back long enough for the other to go through.

It is preferable in this situation that the frequency of the timing oscillator be such that one cycle comprises a positive operation of the system 10 plus a positive operation of the system 11. The frequency of the pulses in either system will be not more than one such pulse to such a cycle of the timing oscillator.

With the system according to this invention, none of the pulses are lost. There simply is a delay of one when there is a coincidence of two. The two pulse train systems may represent a control function such as one being a representative of a measurement, and the other of a set point. They also may be any other two suitable pulse trains for whatever similarly suitable purpose wherein anti-coincidence is desirable.

As many embodiments may be made of the above invention, and as changes may be made in the embodiments set forth above without departing from the scope of the invention, it is to be understood that all matters hereinbefore set forth or shown in the accompanying drawing is to be interpreted as illustrative only and not in a limiting sense.

We claim:

1. A fluid logic anti-coincidence device wherein coincident pulses in different pulse trains result in the delay of one of the coincident pulses and the loss of neither, said device comprising, in combination, a pair of pulse train systems, each comprising a series arrangement of an input differentiator, a first flip-flop operated from said differentiator, an "and" gate with one input signal means from the output of said flip-flop, a second flip-flop operated from the output of said "and" gate, an output take-off from said second flip-flop, a control reset feedback from said output take-off to said first flip-flop, and a differentiator in said reset feedback, and a timing oscillator scanner system comprising an input oscillator flip-flop, and a pair of control outputs from each side of said oscillator flip-flop, one of said control outputs comprising the second signal to the "and" gate in one of said pulse train systems, and the other of said control outputs comprising a reset signal to the second flip-flop of the other of said pulse train systems, and a differentiator in each of said other of said control outputs, the pulse duration of said pulse train systems being such that not more than one pulse from each train may occur during one cycle of said scanner.

References Cited

UNITED STATES PATENTS

| | | | |
|---|---|---|---|
| 3,093,306 | 6/1963 | Warren | 137—81.5 |
| 3,180,575 | 4/1965 | Warren | 137—81.5 |
| 3,190,554 | 6/1965 | Gehring | 235—201 |
| 3,224,674 | 12/1965 | Warren | 235—201 |
| 3,250,470 | 5/1966 | Grubb | 235—201 |
| 3,253,605 | 5/1966 | Grubb | 137—81.5 |

M. CARY NELSON, *Primary Examiner.*

R. CLINE, *Assistant Examiner.*